March 3, 1970  G. T. CHILDERS  3,497,988
WEED GUARD FOR FISH HOOKS
Filed Feb. 12, 1968

INVENTOR.
GRADY T. CHILDERS

BY

ATTORNEY

United States Patent Office 3,497,988
Patented Mar. 3, 1970

3,497,988
WEED GUARD FOR FISH HOOKS
Grady T. Childers, 2409 Patriot Way,
Greensboro, N.C. 27408
Filed Feb. 12, 1968, Ser. No. 704,794
Int. Cl. A01k 83/00
U.S. Cl. 43—43.4     2 Claims

ABSTRACT OF THE DISCLOSURE

A spring-biased weed guard having two parallel legs fixed at one end to the shank of a fish hook adjacent the eye of the hook. Each leg of the weed guard has at its other end a downwardly and outwardly extending arm with a free end. The weed guard is biased toward the shank and the other end of the guard is normally frictionally supported outwardly of the shank of the hook beyond the point of the hook by the arms. When a fish strikes, the weed guard moves under spring pressure toward the shank.

BACKGROUND OF THE INVENTION

One of the most prevalent places in which fish are found is in waters where weeds, stumps, and other obstructions are abundant. A fish hook of standard construction, with no weed guard, is likely to become caught or snagged in such obstacles, or else the hook soon gathers a bundle of weeds which trail along behind it and effectively prevent fish from striking at the lure. There have been developed various types of weed guards to prevent the fish hook from becoming entangled in such congested areas.

One such weed guard is of the type shown by De Long Patent No. 3,221,437 wherein the guard comprises an outwardly biased spring member having one end securely attached to the eye of the hook shank, and the other end terminating at or above the hook point. In such a position, the guard is supposed to prevent the hook from becoming snagged or caught in weeds or other obstructions, and, when a fish strikes, to expose the hook point to catch the fish. One difficulty with guards of this type that are biased outwardly from the shank is that when the fish strikes, the guard snaps outwardly, possibly preventing the fish from taking the hook.

It has therefore become desirable to provide a weed guard for a fish hook which is not outwardly biased, however, does include a spring member which is effective to protect the hook from becoming entangled in weeds and the like until the fish strikes. Thereupon the spring member is unseated from the point of the hook and snaps to a position alongside the shank.

SUMMARY

In general, the present invention comprises a weed guard which has one end attached to the eyelet of the hook shank and extends therefrom toward the point of the hook, the free end of the guard comprising a resilient, normally closed, bifurcated portion supported by the point, which is moved past the hook inwardly toward the shank upon the striking of the fish to unseat the guard. The guard thus assumes a position generally parallel to and adjacent the shank of the hook, keeping it out of the way.

It is therefore an object of the invention to provide an improved weed guard for a fish hook which keeps the point of the hook free of grass, weeds, and other obstacles in the water.

It is another object of the invention to provide an improved weed guard which protects the point of the hook from snagging on underwater obstructions while the weed guard is in the "cocked" position, but becomes unseated and retracts to a relaxed or tripped position adjacent the shank of the hook when a fish "takes the hook."

It is still another object of the invention to provide a novel and improved weed guard having a spring member which is not biased in an outward direction, so that when the guard is unseated or tripped, it does not spring outwardly from the shank.

Other objects and a more fuller understanding of the invention will become apparent from the following description of the details as well as the accompanying claims.

Figure 3:
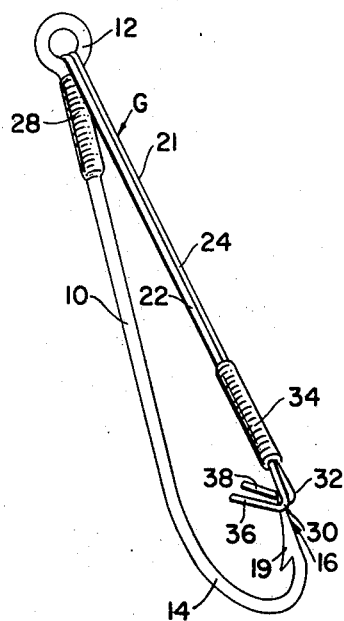
FIGURE 3 is a perspective view of a fish hook equipped with a weed guard embodying the present invention.

Referring now to the drawings and more particularly to FIGURE 3, there is shown a preferred embodiment of the present invention adapted for use on a fish hook H of standard construction including a shank portion 10 having an eyelet 12 at one end thereof, the other end 14 being curved around to a hook point 16. A pair of opposed lateral surfaces 17 and 19 form the enlarged body portion of hook point 16 and terminate in a barb 18.

The weed guard G comprises a body portion 21 including a pair of parallel, juxtaposed wire legs 22 and 24 which extend through eyelet 12 of hook H and are bent back along shank 10 as at 26. A fine gauge wire or thread wrapping 28 is then wrapped around the portion 26 of weed guard G and the corresponding portion of shank 10. The assembly is held in place and relative movement between hook H and guard G prevented by a spot of solder on wrapped portion 28. The material used in forming wire guard G is preferably stainless steel, however other materials could be suitably used such as plastic. It is to be understood that the method of attaching guard G to hook H is typical only and any equivalent attachment means is to be considered within the scope of the invention.

The opposite ends 30 and 32 of legs 22 and 24 are resiliently held together by a second wrapping of fine gauge wire to define a collar 34 around legs 22 and 24 spaced a slight distance (one-eighth of an inch, for example) from ends 30 and 32. The distance between collar 34 and ends 30 and 32 is sufficient to allow the point of the hook to pass between the legs 22 and 24 to unseat the guard upon application of a force directed toward the hook shank 10. At the same time, the collar 34 is spaced close enough to the ends 30, 32 to frictionally support the guard G above the hook point 16 in the absence of an inwardly directed force such as applied by a striking fish. Arms 36 and 38 extend downwardly and outwardly from ends 30 and 32 respectively to facilitate seating of the guard G on the point 16 of hook H. The above described structure describes a spring-biased bifurcated element on the free end of the weed guard.

By way of illustration only, and not as a limitation, the guard G may be dimensioned to extend about $\frac{1}{16}''$ over the hook point 16 when "cocked," and the collar spaced about $\frac{1}{8}''$ from ends 30, 32 and extending about $\frac{3}{8}''$ along the guard toward hook eye 12.

Figure 1:
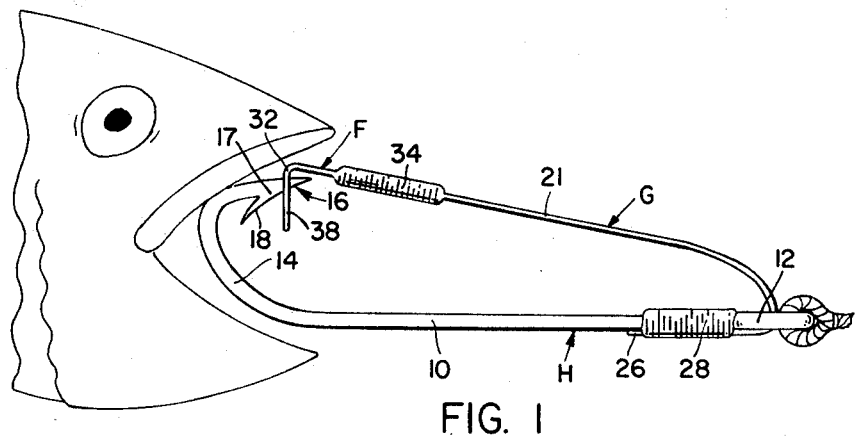
FIGURE 1 is an elevation view of a hook provided with a weed guard according to the present invention in the "cocked" position and about to be struck by a fish.

In the "cocked" position shown in FIGURE 1, the weed guard G is placed atop point 16 with arms 36 and 38 extending downwardly on opposite sides of the point. The wrapping 34 urges end portions 30 and 32 into frictional engagement with the opposed lateral surfaces 17 and 19 and thus will not allow point 16 to slip through under normal pressure. However, when a fish strikes, the mouth of the fish will exert inward pressure on the weed guard G toward shank 10 sufficient to cause the ends 30 and 32 to spread and thus become unseated from point 16, exposing the hook.

Figure 2:
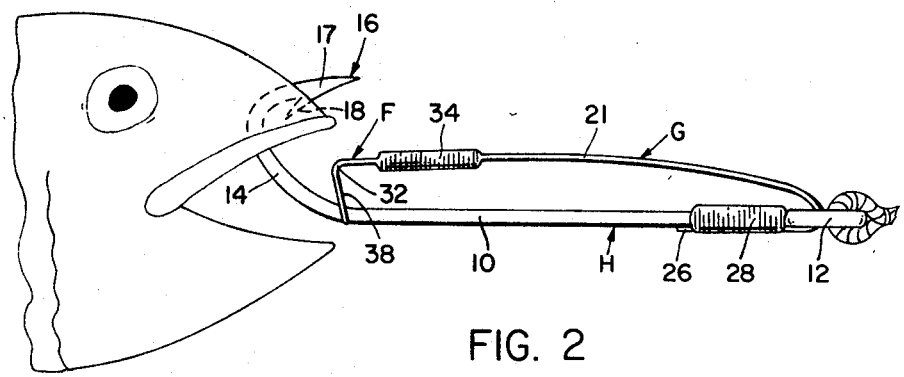
FIGURE 2 is an elevation view of the same showing the position of the weed guard after the fish has struck.

The weed guard will then snap to or assume the position shown in FIGURE 2 with legs 22 and 24 being substantially parallel and closely adjacent to shank 10 of hook H, thus not interfering with or prohibiting the fish from taking the hook.

According to the present invention, the free end F of weed guard G is normally biased toward shank 10, so that when the guard G is unseated from its "cocked" position, it snaps to a position alongside shank 10. It is also to be recognized that if guard G were loosely attached to eyelet 12, no bias would be necessary, since upon the striking by a fish, the guard G would fall to a position alongside shank 10. The important thing is that guard G is not outwardly biased.

In use, the hook 10 is baited in the usual manner and the weed guard G is set in the "cocked" position as shown in FIGURE 1. In this position, the hook is protected from snagging on underwater obstructions, however, when a fish takes the bait, ends 30 and 32 are unseated exposing hook point 16. The weed guard G snaps to a position as shown in FIGURE 2 out of the way of hook point 16.

There is thus provided a weed guard for a fishing lure which is both unique and superior to other known weedless fish hooks.

Various modifications may be made such as changes in shape and size without departing from the spirit of the invention.

I claim:

1. For use with a fishing hook including a shank having an eyelet at one end and a point at the other, an improved weed guard comprising:

(a) an elongated body portion including a pair of parallel, juxtaposed legs formed of a fine gauge resilient material rigidly attached at one end to said shank adjacent said eyelet and extending therefrom toward said hook point, each of said legs further including a downwardly and outwardly extending arm at the other end thereof, each arm having a free end, said body portion being normally spring biased inwardly of said hook point and toward said shank;

(b) a collar adjacent said other end of said body portion surrounding and retaining said legs in a normally parallel, side-by-side relationship up to the point where said arms are connected to said legs, said hook point being placed between and engaging each of said downwardly and outwardly extending arms in a cocked position to support said body portion out of its normal position and outwardly of said hook point from said shank, whereby said hook is prevented from becoming entangled in weeds and the like;

(c) the other end of said legs being responsive to a force applied to said guard toward said shank to spread, allowing said body portion to return to its normal position between the hook point and the shank.

2. The improved weed guard according to claim 1 wherein said one end of the body portion extends through said eyelet and is bent back along the shank of said hook, said one end being attached to said shank by a fine gauge material wrapped around said one end and said shank.

References Cited

UNITED STATES PATENTS

| | | | |
|---|---|---|---|
| 379,080 | 3/1888 | Rice | 43—42.43 |
| 828,964 | 8/1906 | Phelps | 43—43.6 |
| 859,045 | 7/1907 | Burke | 43—43.4 |
| 1,315,408 | 9/1919 | Rabbeth | 43—42.43 X |
| 1,554,940 | 9/1925 | Young et al. | 43—42.43 X |
| 2,586,186 | 2/1952 | Swanberg | 43—42.43 X |
| 2,789,387 | 4/1957 | Plummer | 43—43.6 |
| 3,169,338 | 2/1965 | Morin | 43—43.6 |

SAMUEL KOREN, Primary Examiner

J. H. CZERWONKY, Assistant Examiner

U.S. Cl. X.R.

43—43.6